United States Patent

[11] 3,580,682

[72] Inventors Liviu Iliescu;
Ion Dragos, Bucharest, Romania
[21] Appl. No. 678,805
[22] Filed Oct. 30, 1967
[45] Patented May 25, 1971
[73] Assignee Ministerul Industriei Constructillor De Masini
Bucharest, Romania

[54] METHOD AND STEREOSCOPIC OPTICAL APPARATUS FOR DETERMINING THE ROUGHNESS OF THE SURFACES OF MACHINED PARTS
1 Claim, 3 Drawing Figs.
[52] U.S. Cl. .................................................. 356/168,
350/30, 350/35, 350/36, 350/133
[50] Field of Search ......................................... 356/156,
162, 168; 350/30, 35, 36, 130, 133

[56] References Cited
UNITED STATES PATENTS
2,040,066 5/1936 Ursinus ........................ 350/30
2,790,347 4/1957 Link et al. .................... 350/30
2,674,152 4/1954 Wilkinson .................... 356/168

FOREIGN PATENTS
640,848 1962 Italy .............................. 350/36
907,679 1962 Great Britain ............... 350/35
1,199,018 1965 Germany ...................... 350/35

Primary Examiner—Ronald L. Wibert
Assistant Examiner—J Rothenberg
Attorney—Arthur O. Klein ABSTRACT: A method and apparatus for stereoscopically determining the roughness of the surfaces of machined parts. A stereoscopic viewing means is provided for presenting to the operator stereoscopic images of the surface of a machined part, and simultaneously stereoscopic images of gauge surfaces, so that a comparison of the surface of the machined part with the surface of the gauges can be made. A projecting means is provided for projecting to the stereoscopic viewing means an image of the machined surface which is to be checked, while a pair of projecting means coact with a pair of gauges to project separate images thereof respectively to a pair of ocular means of the stereoscopic viewing means so that in this way images of the gauges are provided for the operator to be viewed simultaneously with the stereoscopic images of the surface of the machined part.

PATENTED MAY 25 1971

INVENTORS:
Liviu ILIESCU
Ion DRAGOS
by: Arthur O. Klein
their Attorney

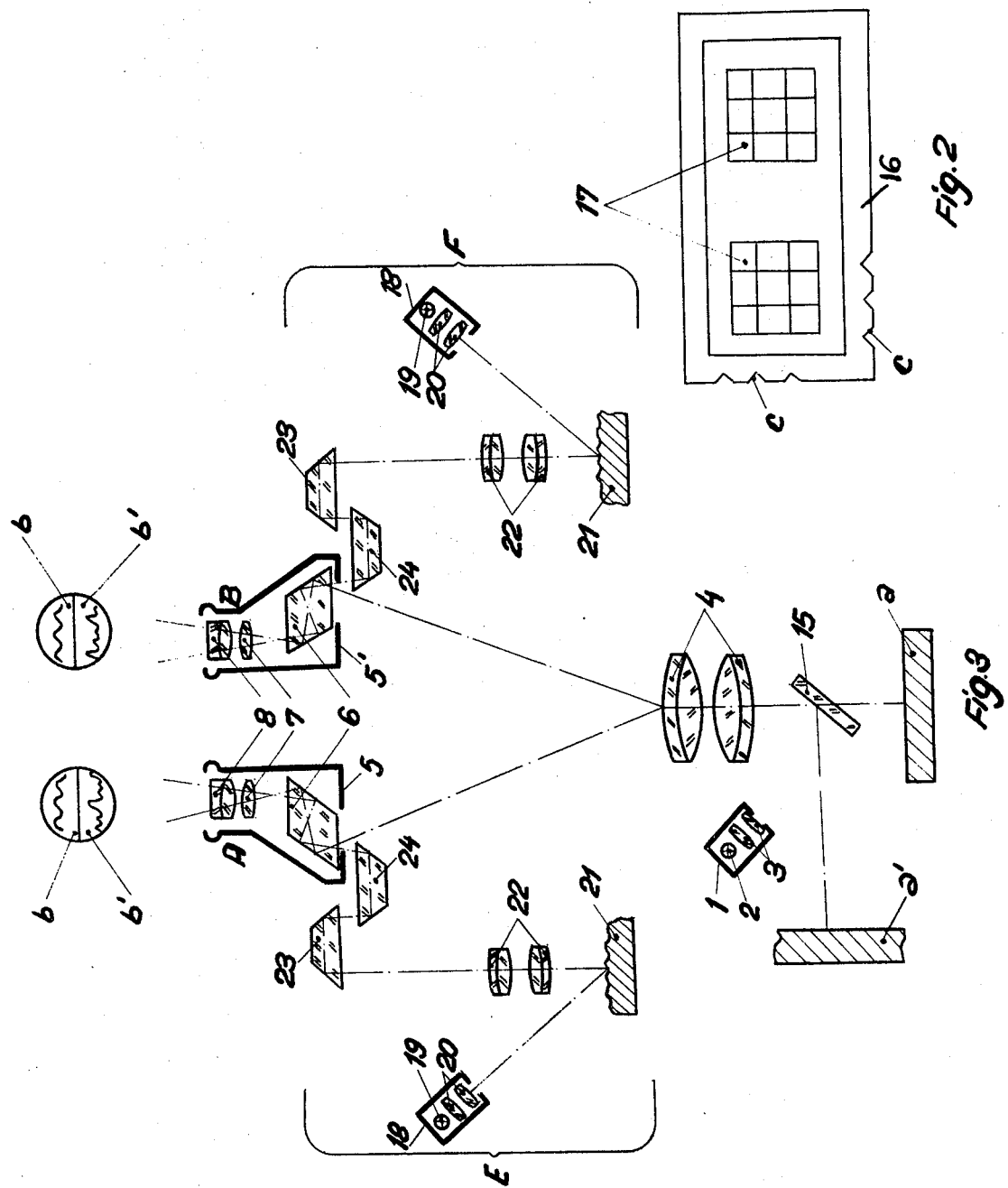

METHOD AND STEREOSCOPIC OPTICAL APPARATUS FOR DETERMINING THE ROUGHNESS OF THE SURFACES OF MACHINED PARTS

This invention is related to a method and to a stereoscopic optical apparatus for determining by comparison the roughness of machined surfaces.

The determination of the roughness of surfaces by comparing them with metallic standards, using a stereoscopic optical comparator is already known. The first image given by the studied surface is formed in the field of the oculars, and the second image of a metallic standard gauge is superposed upon the first image, allowing the direct comparison of the microunevennesses from a zone of the surface of the part with the surface of the standard gauge.

The disadvantage of known stereoscopic optical apparatus, working with the method of comparison with metallic standard gauges, consists in the fact, that, for determining the roughness of the surfaces of the parts, a very large number of metallic standard gauges are necessary for stereoscopic coincidence; such gauges are difficult to manufacture and to maintain.

Also the measuring of the microunevennesses of the surfaces of machined parts with the aid of a stereoscopic optical apparatus is known. Measuring the height of each microunevenness is carried out with the aid of a mobile indicator and a fixed one, the indicators being in stereoscopic coincidence and adjustable from outside. An essential drawback of the known apparatus and method, working with the method of measuring point by point, consists in the fact that, for measuring the roughness of the surface of the part, a large number of measurements, readings, and successive adjustments are necessary which, due to the subjectivity of the operator, leads to erroneous measurements.

This invention eliminates the above shown disadvantages in determining the roughness of surfaces of a machined part; it compares the surface with photographed standard gauges (diapositive white-black or colored), which are mounted on a single frame in stereoscopic coincidence, using a stereoscopic apparatus.

Metallic standard gauges may be used instead of photographs of standard gauges.

The stereoscopic optical apparatus according to the invention, which corresponds to the above-described method, consists of two double optical systems, a first one to observe the surface of the part, the roughness of which is measured, and the other, second one to observe the photographed standard gauge; a device to hold the photographed standard gauges; a mirror which is mounted under the first optical system for selectively observing the roughness of inside surfaces or of vertical surfaces. It is also possible to employ instead of the second system another optical system equivalent to the first, which compares the surfaces with metallic standard gauges, all systems being double for each eye, obtaining in this way a stereoscopic image of the studied surface.

There is described herein below an example of an embodiment of the invention in conjunction with the FIGS. 1, 2, and 3 which represent:

FIG. 2 is a schematic representation of the device for fixing the photographed standard gauges; and FIG. 3 is a schematic representation of the stereoscopic apparatus for comparison with metallic standard gauges.

Figure 1:
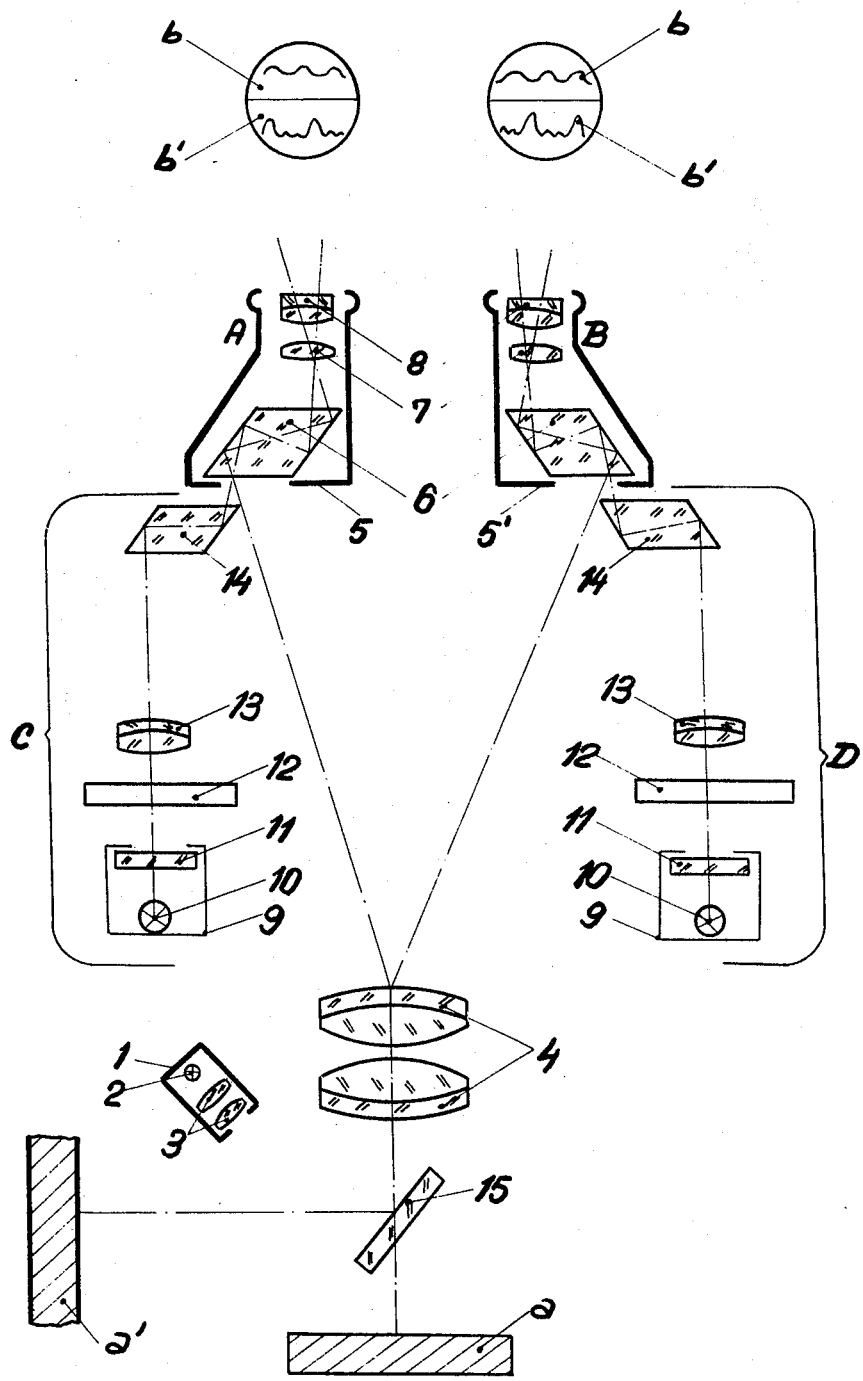
FIG. 1 is a schematic representation of the stereoscopic apparatus for comparison with photographed standard gauges.

The stereoscopic optical apparatus for determining the roughness of machined surfaces by comparing these with photographed standard gauges (FIG. 1), according to the invention, consists of an outfit 1, composed of an incandescent lamp 2 and lenses 3 for illuminating the surface of part $a$ with a beam of parallel rays. An objective formed by lenses 4, projects the image of the observed part into one half $b'$ of the field of both oculars 5, 5' which form two optical systems A B for each eye, consisting each of a prism 6 and lenses 7 and 8. For illuminating the photographed standard gauges two projectors 9 are used, comprising an incandescent lamp 10 and a white milky glass 11, used for uniform illuminating of the transparencies in the form of white-black or colored diapositives, mounted in stereoscopic coincidence in a fixing device 12. A double objective 13 projects, by means of a prism 14, an image of the photographed standard gauges in the other half $b$ of the field of the oculars 5, 5', forming two optical systems C, D for obtaining the stereoscopic image. For determining the roughness of inside or vertical surfaces $a'$, a mirror 15 mobile in all directions, is mounted under the objective 4.

The supporting device 12 for the photographed standard gauges, according to the invention (FIG. 2), consists of a frame 16, having lateral grooves $c$ for correct positioning of each pair of standard gauges in front of the objectives 13, in which some photographed standard gauges 17 are fixed (white-black or colored diapositives) in stereoscopic coincidence.

The determination of the roughness of machined surfaces by comparing them with photographed standard gauges, according to the invention, is done by taking aim simultaneously at the machined part and at the photographed standard, gauge, comparing by superposing the images, and choosing the next class of roughness according to the standard gauges, by moving the frame 16 in front of the objectives 13.

The device for comparison with metallic standard gauges (FIG. 3,) which can be adapted, instead of the device for comparison with photographed standard gauges, to the stereoscopic optical apparatus, according to the invention, consists of a projector 18 for illuminating the surfaces of the standard gauges, comprising an incandescent lamp 19 and some lenses 20, which project a fascicle of parallel rays upon metallic standard gauges 21 in stereoscopic coincidence. An objective, formed by the lenses 22, projects the image of the surface of the metallic standard gauges 21 in the other half $b'$ of the field of the oculars 5, 5', by means of prisms 23 and 24. The whole device forms a double optical system for each eye E,F.

The determination by comparison with metallic standard gauges is also achieved by simultaneously taking aim upon the part and the standard gauge, choosing by comparison the next class of roughness, changing each pair of standard gauges which are not mounted on a frame in front of the objective 21.

The method and the stereoscopic optical apparatus, according to the invention, present the following advantages:

they allow the roughness of internal and external surfaces in either horizontal or vertical planes to be determined;

they determine the roughness of the surfaces of machined parts, by comparison with photographed standard gauges (white-black or colored diapositives) in a manner which is easy to handle and to maintain;

metallic standard gauges in stereoscopic coincidence can also be utilized.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claim.

We claim:

1. In a device for determining the roughness of the surface of a machine part, stereoscopic viewing means having a pair of oculars for providing a pair of stereoscopic viewing fields, a single projecting means coacting with said stereoscopic viewing means for providing the latter in said fields thereof with images of the surface of a machined part, and a pair of additional projecting means coacting with said viewing means for respectively providing in the viewing fields thereof images of a pair of gauges to be compared with the images of the surfaces of the machine part, said single projecting means including a projecting objective having an optical axis symmetrically situated between the optical axes of said oculars of said viewing means, said pair of additional projecting means respectively including objectives respectively having parallel optical axes extending parallel to the optical axis of said objective of said single projecting means with the optical axes of said oculars situated between the optical axes of said objectives of said additional projecting means.